(12) United States Patent
Kumar et al.

(10) Patent No.: US 11,446,697 B2
(45) Date of Patent: Sep. 20, 2022

(54) METHOD FOR IMPARTING AN OPTICAL ELEMENT WITH A LIGHT INFLUENCING PROPERTY IN A GRADIENT PATTERN

(71) Applicant: Transitions Optical, Ltd., Tuam (IE)

(72) Inventors: Anil Kumar, Murrysville, PA (US); David Park, Tuam (IE); Brian Smyth, Tuam (IE)

(73) Assignee: Transitions Optical, Ltd., Tuam (IE)

( * ) Notice: Subject to any disclaimer, the term of this patent is extended or adjusted under 35 U.S.C. 154(b) by 476 days.

(21) Appl. No.: 16/470,413

(22) PCT Filed: Dec. 28, 2016

(86) PCT No.: PCT/EP2016/082752
§ 371 (c)(1),
(2) Date: Jun. 17, 2019

(87) PCT Pub. No.: WO2018/121852
PCT Pub. Date: Jul. 5, 2018

(65) Prior Publication Data
US 2020/0009605 A1    Jan. 9, 2020

(51) Int. Cl.
*B05D 1/00* (2006.01)
*B05D 5/06* (2006.01)

(52) U.S. Cl.
CPC ............ *B05D 1/005* (2013.01); *B05D 5/065* (2013.01); *B05D 2201/02* (2013.01); *B05D 2203/35* (2013.01); *B05D 2490/50* (2013.01); *B05D 2503/00* (2013.01)

(58) Field of Classification Search
CPC ................ B05D 1/005; B05D 2201/02; B05D 2490/50; G02B 3/00; B29D 11/00; B29D 11/00009
See application file for complete search history.

(56) References Cited

U.S. PATENT DOCUMENTS

| | | | |
|---|---|---|---|
| 4,731,264 | A | 3/1988 | Lin et al. |
| 4,756,973 | A | 7/1988 | Sakagami et al. |
| 5,096,457 | A | 3/1992 | Nakagawa et al. |
| 5,134,191 | A | 7/1992 | Takarada et al. |
| 5,231,156 | A | 7/1993 | Lin |
| 5,462,806 | A | 10/1995 | Konishi et al. |

(Continued)

FOREIGN PATENT DOCUMENTS

| | | |
|---|---|---|
| WO | 9420581 A1 | 9/1994 |
| WO | 2016144333 A1 | 9/2016 |

*Primary Examiner* — Elizabeth A Burkhart
(74) *Attorney, Agent, or Firm* — The Webb Law Firm

(57) ABSTRACT

A method for imparting an optical element with at least one light influencing property in a gradient pattern. The method includes (a) providing an optical substrate having first and second surfaces; (b) depositing a first composition over the first surface of the optical substrate so as to provide a first treated surface region and an untreated surface region, the first composition including a material which provides a light influencing property; (c) depositing a second composition over the optical substrate of (b) to provide a second treated surface region over the untreated surface region and over a portion of the first treated surface region to form a first overlap region; and (d) spinning the optical substrate of (c) thereby providing the optical element having a light influencing property in a gradient pattern.

17 Claims, 1 Drawing Sheet

(56) References Cited

U.S. PATENT DOCUMENTS

| | | |
|---|---|---|
| 5,772,764 A | 6/1998 | Akimoto |
| 5,867,316 A | 2/1999 | Carlson et al. |
| 5,882,774 A | 3/1999 | Jonza et al. |
| 6,096,375 A | 8/2000 | Ouderkirk et al. |
| 6,495,205 B1 | 12/2002 | Gibson et al. |
| 7,097,303 B2 | 8/2006 | Kumar et al. |
| 7,189,456 B2 | 3/2007 | King |
| 7,256,921 B2 | 8/2007 | Kumar et al. |
| 7,341,112 B2 | 3/2008 | Doerr et al. |
| 7,342,112 B2 | 3/2008 | Kumar et al. |
| 7,374,282 B2 | 5/2008 | Tendler |
| 7,452,611 B2 | 11/2008 | Blackbum et al. |
| 7,662,436 B1 | 2/2010 | Wei et al. |
| 8,012,386 B2 | 9/2011 | Clerc |
| 8,172,393 B2 | 5/2012 | Tendler |
| 8,608,988 B2 | 12/2013 | Bowles et al. |
| 8,651,660 B2 | 2/2014 | Barzak et al. |
| 9,028,728 B2 | 5/2015 | Bancroft et al. |
| 2002/0041929 A1* | 4/2002 | Magne ............... B05B 13/0228 427/240 |
| 2004/0142105 A1 | 7/2004 | Sakurada et al. |
| 2005/0012998 A1 | 1/2005 | Kumar et al. |
| 2011/0135850 A1 | 6/2011 | Saha et al. |
| 2011/0216273 A1* | 9/2011 | He ........................ C09K 19/38 349/96 |
| 2015/0253465 A1 | 9/2015 | Trapani et al. |
| 2016/0008836 A1* | 1/2016 | Nakamura ............... G02C 7/02 427/164 |

* cited by examiner

METHOD FOR IMPARTING AN OPTICAL ELEMENT WITH A LIGHT INFLUENCING PROPERTY IN A GRADIENT PATTERN

CROSS-REFERENCE TO RELATED APPLICATION

This application is the United States national phase of International Application No. PCT/EP2016/082752 filed Dec. 28, 2016, the disclosure of which is hereby incorporated by reference in its entirety.

FIELD OF THE INVENTION

The present invention is directed to a method for imparting an optical element with a light influencing property in a gradient pattern. The present invention also relates to an optical element having such light influencing property in a gradient pattern.

BACKGROUND OF THE INVENTION

Gradient tinting methods are known for use in coloring optical elements, such as lenses. The gradient tinting effect provides a functional advantage in that the lens generally has a higher color density at the top of the lens for improved distance viewing with less color density at the bottom of the lens, and an aesthetic effect for fashion and style.

Further, there are well known methods for applying a photochromic composition to optical elements. For example, photochromic materials may be incorporated into the substrate components used to form the optical element. Alternatively, the photochromic materials may be applied to the surface of the optical element and permitted to penetrate into the surface region (known as imbibition). Additionally, the photochromic material can be applied to the optical element as a coating by known methods, such as spin coating, dip coating, spray coating, and the like.

Methods have been disclosed to achieve a gradient photochromic optical element. Generally, gradient tinting of eyewear lenses is accomplished by dipping or submerging the lens into a dye bath. This process requires more precise and reproducible processing than is required for solid tinting or coloring. Moreover, some optical substrates, such as polycarbonate lens material, absorb dyes very poorly. While methods have been developed to overcome these processing difficulties, such methods often require additional manufacturing steps, thus adding additional manufacturing costs.

Also known in the art is a method for preparing an optical element having applied thereto a photochromic composition on at least one surface of the optical element in a controlled, predetermined pattern using an inkjet printing apparatus to provide a linearly gradient color pattern on the optical element when the optical element is exposed to actinic radiation. These inkjet application techniques require that the viscosity of the photochromic composition be stringently controlled in order to maintain controlled application of the composition and to prevent clogging of the jets.

Accordingly, it would be desirable to provide a cost-effective and efficient method of imparting a light influencing property to an optical element in a gradient pattern. It would be further desirable to provide an optical article having a light influencing property in a gradient pattern obtainable by a method described herein.

SUMMARY OF THE INVENTION

The present invention provides a method for imparting an optical element with at least one light influencing property in a gradient pattern. The method comprises (a) providing an optical substrate having a first surface and a second surface; (b) depositing a first composition over a portion of the first surface of the optical substrate so as to provide a first treated surface region and an untreated surface region, the first composition comprising a material which provides at least one light influencing property; (c) depositing at least one second composition over the optical substrate of (b) to provide at least a second treated surface region over at least a portion of the untreated surface region and over a portion of the first treated surface region to form a first overlap region; and (d) spinning the optical substrate of (c) thereby providing the optical element having a light influencing property in a gradient pattern over the first surface thereof. The present invention further provides an optical element with at least one light influencing property in a gradient pattern, the optical element obtainable by a method described herein.

DETAILED DESCRIPTION OF THE INVENTION

Figure 1:
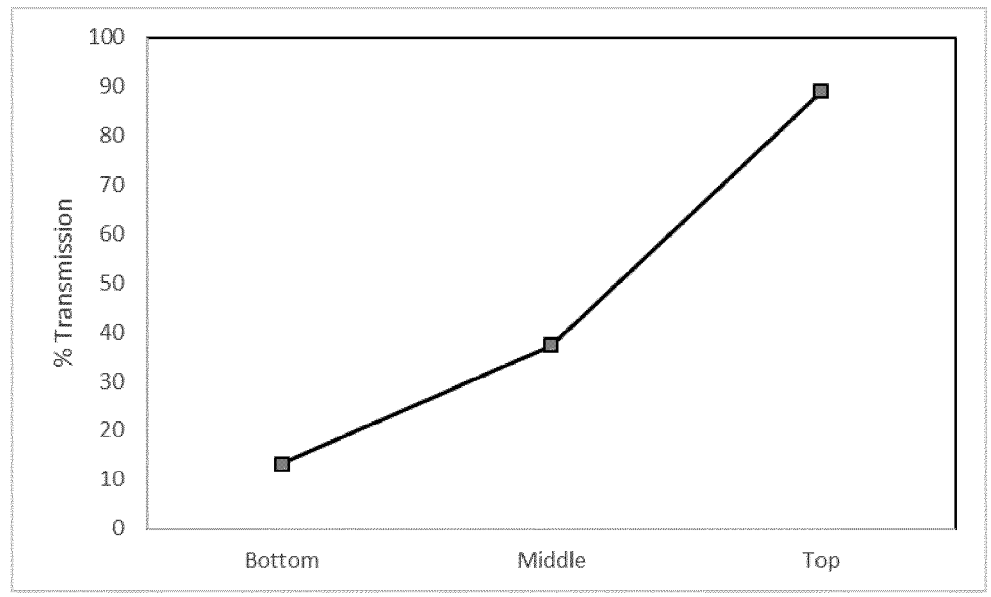
FIG. 1 shows the transmission (% T, CIE Y transmission) recorded at different locations for the lens of Example 2.

Unless otherwise indicated, all ranges or ratios disclosed herein are to be understood to encompass any and all sub-ranges or sub-ratios subsumed therein. For example, a stated range or ratio of "1 to 10" should be considered to include any and all sub-ranges between (and inclusive of) the minimum value of 1 and the maximum value of 10. That is, all sub-ranges or sub-ratios beginning with a minimum value of 1 or more and ending with a maximum value of 10 or less, such as, but not limited to, 1 to 6.1; 3.5 to 7.8; and 5.5 to 10.

As used herein and in the claims, the term "polymer" and like terms, such as "polymeric", means homopolymers (prepared from a single monomer), copolymers (prepared from two or more different monomers), and graft polymers, including but not limited to comb graft polymers, star graft polymers, and dendritic graft polymers.

As used in this specification and the appended claims, the articles "a", "an", and "the" include plural referents unless expressly and unequivocally limited to one referent. Additionally, for the purposes of this specification, unless otherwise indicated, all numbers expressing quantities of ingredients, reaction conditions, and other properties or parameters used in the specification are to be understood as being modified in all instances by the term "about". Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

As previously mentioned, the present invention is directed to a method for imparting an optical element with at least one light influencing property in a gradient pattern. The method comprises (a) providing an optical substrate having a first surface and a second surface; (b) depositing a first composition over a portion of the first surface of the optical substrate so as to provide a first treated surface region and an untreated surface region, the first composition comprising a material which provides at least one light influencing property; (c) depositing at least one second composition over the optical substrate of (b) to provide at least a second treated surface region over at least a portion of the untreated surface region and over a portion of the first treated surface region to form a first overlap region; and (d) spinning the optical substrate of (c) thereby providing the optical element having a light influencing property in a gradient pattern over the first surface thereof.

As used herein, the term "light influencing property" and like terms means that the indicated material is capable of modifying by absorption (or filtering) of incident light radiation, e.g., visible, ultraviolet (UV) and/or infrared (IR) radiation, that impinges on the material. More specifically, the light influencing property can be light polarization, e.g., by means of a polarizer and/or dichroic dye; a change in light absorption properties, e.g., by use of a chromophore that changes color upon exposure to actinic radiation, such as a photochromic material; polarization and a change in light absorption properties concurrently, e.g., by use of a photochromic-dichroic material; transmission of only a portion of the incident light radiation, e.g., by use of a fixed tint, such as a conventional dye; or by a combination of one or more of such light influencing functions.

As used herein, the term "gradient pattern" refers to a gradual and ultimately visually discernible variation in one or more light influencing properties over an area of the optical element. The gradual variation can occur across the surface of the optical element in one direction. For example, when the optical element is a lens, the variation in the light influencing property can occur from the bottom of the lens to the top of the lens. That is, the gradual variation of at least one light influencing property can occur such that the light influencing property changes gradually from the bottom of the lens to the top, or vice versa. Further, the gradient pattern can be a radial gradient pattern where the gradual variation in one or more light influencing properties occurs radially from one or more "points" of the optical element surface, e.g., a lens surface, to the outer perimeter or peripheral region of the optical element. The one or more points from which the radially gradient pattern extends outwardly to the peripheral region may or may not be positioned in the center region of the optical element.

OPTICAL ELEMENT

The optical element can be any of those known in the art. Generally, the optical element is selected from the group consisting of lenses, windows, display elements, goggles, visors, face shields, automotive transparencies, e.g., sunroofs and light covers, aerospace transparencies, and wearable transparencies. Further, the optical element used in the method of the present invention can be substantially transparent, or it may possess a uniform color (e.g., the optical element may be tinted), prior to deposition of the aforementioned composition(s).

In a particular embodiment, the optical element is a lens. The lens can be an ophthalmic lens. As used herein, the term "optical" means pertaining to or associated with light and/or vision. As used herein, the term "ophthalmic" means pertaining to or associated with the eye and vision. Non-limiting examples of ophthalmic elements include corrective and non-corrective (piano) lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including, without limitation, contact lenses, intra-ocular lenses, magnifying lenses, and protective lenses or visors. As used herein, the term "display" means the visible or machine-readable representation of information in words, numbers, symbols, designs, or drawings. Non-limiting examples of display elements and devices include screens and monitors. As used herein, the term "window" means an aperture adapted to permit the transmission of radiation therethrough.

The optical element can comprise any of the optical substrates well known in the art. The substrate may comprise a polymeric organic material chosen from thermosetting polymeric organic materials, thermoplastic polymeric organic materials, or a mixture of such polymeric organic materials. The polymeric organic material can be chosen from poly($C_1$-$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly (vinyl alcohol), poly(vinyl chloride), poly(vinylidene chloride), thermoplastic polycarbonates, polyesters, polyurethanes, polythiourethanes, polysulfithiourethanes, poly(urea-urethane), poly(ethylene terephthalate), polystyrene, poly(alpha methylstyrene), copoly(styrene-methylmethacrylate), copoly(styrene-acrylonitrile), polyvinyl butyral or polymers prepared from bis(allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol bismethacrylate monomers, alkoxylated polyhydric alcohol polyacrylate monomers, styrene monomers, urethane acrylate monomers, glycidyl acrylate monomers, glycidyl methacrylate monomers, diallylidene pentaerythritol monomers, or mixtures of such monomers.

Substrates suitable for use in the preparation of optical elements of the present invention typically demonstrate a refractive index of at least 1.55 and can include non-plastic substrates, such as glass. More often, substrates commonly used in optical applications are used, including polyol(allyl carbonate) monomers, e.g., allyl diglycol carbonates such as diethylene glycol bis(allyl carbonate), which monomer is sold under the registered trademark CR-39 by PPG Industries, Inc.; poly(urea)urethane polymers, which are prepared, for example, by the reaction of a polyurethane prepolymer and a diamine curing agent, a composition for one such polymer being sold under the registered trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the registered trademark LEXAN by Sabic Global Technologies; polyesters, such as the material sold under the registered trademark MYLAR by Dupont Teijin Films; poly(ethylene terephthalate); polyvinyl butyral; poly(methyl methacrylate), such as the material sold under the registered trademark PLEXIGLAS by Arkema France Corporation, and polymers prepared by reacting polyfunctional isocyanates with polythiols or polyepisulfide monomers, either homopolymerized or co- and/or terpolymerized with polythiols, polyisocyanates, polyisothiocyanates, and, optionally, ethylenically unsaturated monomers or halogenated aromatic-containing vinyl monomers. Also contemplated are copolymers of such monomers and blends of the described polymers and copolymers with other polymers, e.g., to form interpenetrating network products.

As previously mentioned, in the method of the present invention, a first composition is deposited over a portion of the first surface of the optical substrate (such as any of those described above) so as to provide a first treated surface region and an untreated surface region. The first composition comprises a material which provides at least one light influencing property.

When the light influencing property to be imparted is light polarization, the first composition can contain one or more dichroic dyes as are known in the art. Non-limiting examples of suitable conventional dichroic compounds include azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine and iodates. The dichroic material also can comprise a polymerizable dichroic compound. That is, the dichroic material can comprise at least one group that is capable of being polymerized (i.e., a "polymerizable group"). For example, although not limiting herein, in one non-limiting embodiment the at least one dichroic compound can have at least one alkoxy, polyalkoxy, alkyl, or polyalkyl substituent terminated with at least one polymerizable group.

When the light influencing property imparted is a change in light absorption properties, e.g., through the use of a chromophore that changes color upon exposure to actinic radiation, the first composition (and any second and/or additional compositions) can comprise a photochromic material. Non-limiting examples of photochromic materials useful in the method of the present invention comprise at least one photochromic compound selected from the group consisting of pyrans, spiropyrans, oxazines, spiroxazines, fulgides, fulgimides, metallic dithizonates, diarylethenes, and mixtures thereof. Specific but non-limiting examples of suitable photochromic materials can include indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoroanthenoxazines, spiro(indoline)quinoxazines, fulgides, fulgimides, diarylethenes, diarylalkylethenes, and diarylalkenylethenes. Mixtures of such photochromic compounds are contemplated.

As used herein, the term "photochromic" and similar terms, such as "photochromic compound", includes thermally reversible photochromic compounds, and non-thermally reversible photochromic compounds, and mixtures thereof. The term "thermally reversible photochromic compounds/materials" as used herein means compounds/materials capable of converting from a first state (i.e., unactivated or clear state) to a second state (i.e., activated or colored state) in response to actinic radiation, and reverting back to the first state in response to thermal energy. The term "non-thermally reversible photochromic compounds/materials" as used herein means compounds/materials capable of converting from a first state (i.e., clear or unactivated state) to a second state (i.e., activated or colored state) in response to actinic radiation; and reverting back to the first state in response to actinic radiation of substantially the same wavelength(s) as the absorption(s) of the colored state. It should be understood that any of the photochromic coatings known in the art can be used as the first composition (and as any of the second and/or additional compositions) in the method of the present invention. For example, suitable photochromic coatings can include those described in U.S. Pat. No. 7,189,456 at column 20 line 49 to column 24 line 6, the recited portions of which are incorporated by reference herein.

When the light influencing property imparted is polarization and a change in light absorption properties concurrently, the first composition (and any subsequently applied second and additional compositions) can comprise photochromic-dichroic materials. The term "photochromic-dichroic" means displaying both photochromic and dichroic (i.e., linearly polarizing) properties under certain conditions, which properties are at least detectable by instrumentation. Thus, photochromic-dichroic compounds have an absorption spectrum for at least visible radiation that varies in response to at least actinic radiation, and are capable of absorbing one of two orthogonal plane polarized components of at least transmitted radiation more strongly than the other (i.e., capable of exhibiting dichroism). Additionally, as with conventional photochromic compounds discussed previously, the photochromic-dichroic compounds disclosed herein can be thermally reversible. That is, the photochromic-dichroic compounds can switch from a first state to a second state in response to actinic radiation and revert back to the first state in response to thermal energy.

For example, according to various non-limiting embodiments disclosed herein, the photochromic-dichroic compound can have a first state having a first absorption spectrum, a second state having a second absorption spectrum that is different from the first absorption spectrum, and can be adapted to switch from the first state to the second state in response to at least actinic radiation and to revert back to the first state in response to thermal energy. Further, the photochromic-dichroic compound can be dichroic (i.e., linearly polarizing) in one or both of the first state and the second state. For example, although not required, the photochromic-dichroic compound can be linearly polarizing in an activated state and non-polarizing in the bleached or faded (i.e., not activated) state. As used herein, the term "activated state" refers to the photochromic-dichroic compound when exposed to sufficient actinic radiation to cause the at least a portion of the photochromic-dichroic compound to switch from a first state to a second state. Further, although not required, the photochromic-dichroic compound can be dichroic in both the first and second states. While not limiting herein, for example, the photochromic-dichroic compound can linearly polarize visible radiation in both the activated state and the bleached state. Further, the photochromic-dichroic compound can linearly polarize visible radiation in an activated state, and can linearly polarize UV radiation in the bleached state.

Non-limiting examples of photochromic-dichroic compounds suitable for use in the first and any subsequently applied second and additional compositions used in the methods of the present invention can include those described in detail in U.S. Patent Application Publication No. 2005/0012998A1 at paragraphs [0089] to [0339], which disclosure is incorporated herein by reference. Mixtures of any of the aforementioned photochromic-dichroic materials can be used.

When the light influencing property imparted is the transmission of only a portion of the incident light radiation, the first composition (and any subsequently applied second and additional compositions) can comprise a fixed tint material, such as a conventional dye. Non-limiting examples of such conventional dyes are those which can be selected from the family of compounds consisting of azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, and mixtures thereof.

It should be noted that the first composition (and, when desired, any of the subsequently applied second and/or additional compositions) can comprise more than one material which imparts the same or different light influencing property. That is, there may be more than one light influencing property imparted to the optical element.

In addition to the one or more materials which impart one or more light influencing properties, the first composition (and where desired, any of the second and/or additional compositions) can comprise one or more polymeric components. Examples of suitable polymeric components can include, but are not limited to, the following polymers or precursors thereof: polyvinyl alcohol, polyvinyl chloride, polyurethane, polyacrylate, and polycaprolactam. The composition(s) can be a thermoplastic composition or a thermosetting composition. In a particular embodiment of the present invention, the composition can be a curable composition.

The curable resin composition typically includes a first reactant (or component) having functional groups, e.g., hydroxyl functional polymer reactant; and a second reactant (or component) that is a crosslinking agent having functional groups that are reactive towards and that can form covalent bonds with the functional groups of the first reactant. The first and second reactants of the curable resin composition can each independently include one or more functional species, and are each present in amounts sufficient to provide cured coatings having a desirable combination of physical properties, e.g., smoothness, solvent resistance, and hardness.

Examples of curable resin compositions that can be used with the curable resin compositions include, but are not limited to, curable resin compositions that include an epoxide functional polymer, such as (meth)acrylic polymers containing residues of glycidyl (meth)acrylate, and an epoxide reactive crosslinking agent (e.g., containing active hydrogens, such as hydroxyls, thiols, and amines); curable resin compositions that include active hydrogen functional polymer, such as hydroxy functional polymer and capped (or blocked) isocyanate functional crosslinking agent; and curable resin compositions that include active hydrogen functional polymer, such as hydroxy functional polymer, and aminoplast crosslinking agent.

With some aspects of the present invention, the colorant composition comprises a material which imparts a light influencing property and a curable urethane (or polyurethane) resin composition. Such a curable urethane composition typically contains an active hydrogen functional polymer, such as an amino functional polymer or a hydroxy functional polymer; and a capped (or blocked) isocyanate functional crosslinking agent. Active hydrogen functional polymers are well known in the art. Hydroxy functional polymers that can be used in such compositions include, but are not limited to, art-recognized hydroxy functional vinyl polymers, hydroxy functional polyesters, hydroxy functional polyurethanes, and mixtures thereof.

Vinyl polymers having active hydrogen groups, such as hydroxy functional groups, can be prepared by free radical polymerization methods that are known in the art. With some aspects of the present invention, a hydroxy functional vinyl polymer is prepared from a majority of (meth)acrylate monomers and is referred to herein as a "hydroxy functional (meth)acrylic polymer".

Hydroxy functional polyesters useful in curable compositions that include capped isocyanate functional crosslinking agents can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium.

Hydroxy functional urethanes can be prepared by art-recognized methods. Typically, one or more difunctional isocyanates are reacted with one or more materials having two active hydrogen groups (e.g., diols or dithiols), such that the ratio of active hydrogen groups to isocyanate groups is greater than 1, as is known to the skilled artisan.

By "capped (or blocked) isocyanate crosslinking agent" is meant a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are typically capable of reacting and forming substantially permanent covalent bonds with the active hydrogen groups of the active hydrogen functional polymer (e.g., with the hydroxy groups of a hydroxy functional polymer).

The isocyanate or mixture of isocyanates of the capped isocyanate crosslinking agent typically has two or more isocyanate groups (e.g., 3 or 4 isocyanate groups). Examples of suitable isocyanates that can be used to prepare the capped isocyanate crosslinking agent include, but are not limited to, monomeric diisocyanates, e.g., $\alpha, \alpha'$-xylylene diisocyanate, $\alpha, \alpha, \alpha', \alpha'$-tetramethylxylylene diisocyanate, and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet, or allophanate linkages, e.g., the trimer of IPDI.

The capped isocyanate crosslinking agent can also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared (e.g., "TMP-3IPDI"). The three free isocyanate groups per TMP-3IPDI adduct are then capped with a capping group, e.g., a linear or branched $C_2$-$C_8$ alcohol.

To catalyze the reaction between the isocyanate groups of the capped polyisocyanate crosslinking agent and the active hydrogen groups of the active hydrogen functional polymer, one or more catalysts are typically present in the curable photochromic coating composition in amounts of from, for example, 0.1 to 5 percent by weight, based on total resin solids of the composition. Classes of useful catalysts include, but are not limited to, urethanization catalysts such as organic tin compounds, e.g., tin(II) octanoate and dibutyltin(IV) dilaurate, as well as bismuth compounds, zinc compounds and salts thereof, zirconium compounds and salts thereof, carboxylates, and tertiary amines, e.g., diazabicyclo[2.2.2]octane. Mixtures of catalysts can be used.

The compositions useful in the method of the present invention optionally further include a solvent. Examples of suitable solvents can include, but are not limited to, acetates, alcohols, ketones, glycols, ethers, aliphatics, cycloaliphatics, and aromatics. Examples of suitable acetates include, but are not limited to, ethyl acetate, butyl acetate, and glycol acetate. Examples of suitable ketones include, but are not limited to, methyl ethyl ketone and methyl-N-amyl ketone. Examples of suitable aromatics include, but are not limited to, toluene, naphthalene, and xylene. In one aspect of the present invention, one or more solvents can be added to each of the first reactant and the second reactant. Suitable solvent blends can include, for example, one or more acetates, propanol and its derivatives, one or more ketones, one or more alcohols, and/or one or more aromatics.

The compositions useful in the method of the present invention may contain one or more additives, such as rheology additives for flow and wetting, e.g., poly(2-ethylhexyl)acrylate, adjuvant resin to modify and optimize coating properties, antioxidants hindered amine light stabilizers (HALS) and ultraviolet light absorbers (UVA), e.g., hydroxyphenylbenzotriazole, hydroxybenzophenones, hydroxyphenyl-s-triazines, oxanalides. Examples of useful antioxidants, HALS, and UVAs include those available commercially from BASF under the trademarks IRGANOX and TINUVIN.

As mentioned previously, the first composition is deposited over a portion of the first surface of the optical substrate so as to provide a first treated surface region and an untreated surface region. The first composition generally is deposited over at least 15 percent of the first surface of the optical substrate. For example, first composition can be deposited over at least 15 percent of the first surface of the optical substrate. For example, first composition can be deposited over at least 25 percent of the first surface of the optical substrate. For example, first composition can be deposited over at least 35 percent of the first surface of the optical substrate. For example, first composition can be deposited over at least 50 percent of the first surface of the optical substrate.

Subsequently, at least one second composition is deposited over the optical substrate to provide at least a second treated surface region over at least a portion of the untreated surface region and over a portion of the first treated surface region thus forming a first overlap region. In a particular example, the second composition is deposited over a portion of the first treated surface region to form a first overlap region, and over the entire untreated surface region to form a second treated surface region.

Alternatively, the second composition is deposited over a portion of the first treated surface region to form a first overlap region, and over only a portion of the untreated surface region to form a second treated surface region and a remaining untreated surface region. In such a case, the method can further comprise depositing at least one additional composition over at least a portion of the second treated surface region to form a second overlap region, and over at least a portion of the remaining untreated surface.

The method contemplates repeated deposition of one or more additional compositions over the remaining untreated surface to form additional overlap regions. Each overlap region thereby defined can have a width in the range of 1 to 25 millimeters. For example, the overlap region can have a width in the range of 5 to 20 millimeters. For example, the overlap region can have a width in the range of 8 to 12 millimeters.

The at least one second composition and any subsequently deposited additional compositions can be the same or different one from the other and can be the same or different from the first composition. The at least one second composition and/or the at least one additional composition can comprise any of the compositions previously described in regards to the first composition. In a particular example, the at least one second composition provides at least one light influencing property which can be the same or different from the light influencing property imparted by the first composition.

The first, second, and any additional compositions can be deposited on the surface of the optical substrate by any application means known in the art. For example, first, second, and any additional compositions can be applied to the optical substrate surface by spray techniques, including ultrasonic spray techniques, curtain application techniques, liquid dispenser means, and by inkjet application techniques.

In a particular example of the present invention, during deposition of the first composition, the optical substrate is positioned at an angle ranging from 15° to 50° from horizontal. This deposition angle facilitates removal of excess deposited liquid composition from the surface of the optical substrate. Also, during deposition of the at least one second composition and/or the at least one additional composition, the optical substrate is positioned at an angle of from 15° to 50° from horizontal. The respective angles during deposition of the at least one second composition and/or the at least one additional composition can be the same or different from the angle of deposition of the first composition. Likewise, the angle of deposition of the second composition and any additional composition(s) can vary one from the other provided the optical substrate is positioned at an angle ranging from 15° to 50° from horizontal.

Once the first composition, the at least one second composition, and any subsequently deposited additional compositions is/are deposited in a predetermined pattern, the optical substrate thus prepared is subjected to spinning techniques to provide the optical element having one or more light influencing property(ies) in a gradient pattern over the surface thereof. The spinning can be accomplished in one or more stages. In a particular example of the present invention, the optical substrate is first subjected to spinning at a speed of 200 rpm to less than 1000 rpm for a period of 2 to 20 seconds, then subsequently subjected to spinning at a speed of from 1000 rpm to 2000 rpm for a period of from 2 to 20 seconds.

The optical substrate prepared by the method described above can be subjected to conditions to effect drying of the compositions and/or curing of any reactive components comprising the compositions which have been deposited. As used herein, the terms "dried" or "drying" mean that the optical element is exposed to ambient conditions or elevated temperatures in order to evaporate any solvents present in the compositions which have been deposited thereover. The compositions can be at least partially cured to promote at least partial reaction of any reactive components present in the composition(s). Both radiation cure and thermal cure conditions are contemplated.

The optical elements prepared by the method of the present invention optionally can include one or more layers in addition to the composition layer(s) described above. Examples of such additional layers include, but are not limited to, primer coatings and films (typically applied to the optical element surface(s) prior to deposition of the first composition); protective coatings and films applied before or after deposition of the compositions to the optical substrate surface, including transitional coatings and films; abrasion resistant coatings and films; anti-reflective coatings and films; polarizing coatings and films; and combinations thereof. As used herein, the term "protective coating or film" refers to coatings or films that can prevent wear or abrasion, provide a transition in properties from one coating or film to another, protect against the effects of polymerization reaction chemicals and/or protect against deterioration due to environmental conditions, such as moisture, heat, ultraviolet light, oxygen, etc.

As used herein, the term "transitional coating and film" means a coating or film that aids in creating a gradual change in properties or compatibility between two coatings or films, or a coating and a film. For example, although not limiting herein, a transitional coating can aid in creating a gradual change in hardness between a relatively hard coating and a relatively soft coating. Non-limiting examples of transitional coatings include radiation-cured, acrylate-based thin films as described in U.S. Pat. No. 7,452,611 B2, which are hereby specifically incorporated by reference herein.

As used herein, the term "abrasion-resistant coating and film" refers to a protective polymeric material that demonstrates a resistance to abrasion that is greater than a standard reference material, e.g., a polymer made of CR-39® monomer available from PPG Industries, Inc., as tested in a method comparable to ASTM F-735 Standard Test Method for Abrasion Resistance of Transparent Plastics and Coatings Using the Oscillating Sand Method. Non-limiting examples of abrasion-resistant coatings can include, but are not limited to, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT® and HI-GARD® coatings, available from SDC Coatings, Inc. and PPG Industries, Inc., respectively.

The abrasion-resistant coating or film (often referred to as a hard coat) can, with some aspects, be selected from art-recognized hard coat materials, such as organosilane abrasion-resistant coatings. Organosilane abrasion-resistant coatings, often referred to as hard coats or silicone-based hard coatings, are well known in the art and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, line 58 through column 2, line 8, and column 3, line 52 through column 5, line 50, which disclosures describe organosilane hard coatings and which disclosures are incorporated herein by reference. Reference is also made to U.S. Pat. Nos. 4,731,264, 5,134, 191, 5,231,156, and International Patent Publication No. WO 94/20581 for disclosures of organosilane hard coatings, which disclosures are also incorporated herein by reference. The hard coat layer can be applied by art-recognized coating methods such as, but not limited to, roll coating, spray coating, curtain coating, and spin coating.

Non-limiting examples of suitable antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc. Non-limiting examples of suitable conventional photochromic coatings and films include, but are not limited to, coatings and films comprising conventional photochromic materials.

In a particular example of the present invention, where at least the first composition comprises a material selected from the group consisting of a dichroic dye, a photochromic-dichroic dye, and mixtures thereof, the first surface of the optical substrate comprises an alignment layer thereover.

For example, the alignment layer can comprise an at least partial coating comprising an at least partially ordered alignment medium. Non-limiting examples of suitable alignment media that can be used in conjunction with the various non-limiting embodiments disclosed herein can include photo-orientation materials, rubbed-orientation materials and liquid crystal materials. Liquid crystal materials, because of their structure, are generally capable of being ordered or aligned so as to take on a general direction. More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis. For example, although not limiting herein, it is possible to align the molecules of a liquid crystal material with a magnetic field, an electric field, linearly polarized infrared radiation, linearly polarized ultraviolet radiation, linearly polarized visible radiation, or shear forces. It is also possible to align liquid crystal molecules with an oriented surface. That is, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the general direction of orientation of the surface. Non-limiting examples of liquid crystal materials suitable for use as alignment media according to various non-limiting embodiments disclosed herein include liquid crystal polymers, liquid crystal pre-polymers, liquid crystal monomers, and liquid crystal mesogens. As used herein, the term "pre-polymer" means partially polymerized materials.

Liquid crystal monomers that are suitable for use in conjunction with various non-limiting embodiments disclosed herein include mono- as well as multi-functional liquid crystal monomers. Further, according to various non-limiting embodiments disclosed herein, the liquid crystal monomer can be a cross-linkable liquid crystal monomer, and can further be a photocross-linkable liquid crystal monomer. As used herein, the term "photocross-linkable" means a material, such as a monomer, a pre-polymer or a polymer, that can be cross-linked on exposure to actinic radiation. For example, photocross-linkable liquid crystal monomers include those liquid crystal monomers that are cross-linkable on exposure to ultraviolet radiation and/or visible radiation, either with or without the use of polymerization initiators.

Non-limiting examples of cross-linkable liquid crystal monomers suitable for use in accordance with various non-limiting embodiments disclosed herein include liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal monomers suitable for use in the at least partial coatings of the alignment facilities according to various non-limiting embodiments disclosed herein include liquid crystal monomers having functional groups chosen from acrylates, methacrylates, alkynes, epoxides, thiols, and blends thereof.

Liquid crystal polymers and pre-polymers that are suitable for use in conjunction with various non-limiting embodiments disclosed herein include main-chain liquid crystal polymers and pre-polymers and side-chain liquid crystal polymers and pre-polymers. In main-chain liquid crystal polymers and pre-polymers, rod- or disc-like liquid crystal mesogens are primarily located within the polymer backbone. In side-chain polymers and pre-polymers, the rod- or disc-like liquid crystal mesogens primarily are located within the side chains of the polymer. Additionally, according to various non-limiting embodiments disclosed herein, the liquid crystal polymer or pre-polymer can be cross-linkable, and further can be photocross-linkable.

Non-limiting examples of liquid crystal polymers and pre-polymers that are suitable for use in accordance with various non-limiting embodiments disclosed herein include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Non-limiting examples of photocross-linkable liquid crystal polymers and pre-polymers that are suitable for use in the at least partial coatings of the alignment facilities according to various non-limiting embodiments disclosed herein include those polymers and pre-polymers having functional groups chosen from acrylates, methacrylates, alkynes, epoxides, thiols, and blends thereof.

Liquid crystal mesogens that are suitable for use in conjunction with various non-limiting embodiments disclosed herein include thermotropic liquid crystal mesogens and lyotropic liquid crystal mesogens. Further, non-limiting examples of liquid crystal mesogens that are suitable for use in conjunction with various non-limiting embodiments disclosed herein include columatic (or rod-like) liquid crystal mesogens and discotic (or disc-like) liquid crystal mesogens.

In a particular example of the present invention, the alignment layer can comprise an ordered liquid crystal material, such as any of those discussed above, having an irreversibly fixed first general direction, and the dichroic dye and/or the photochromic-dichroic dye can be aligned in a second general direction which is parallel to the first general direction. Non-limiting examples of such alignment layers comprising ordered liquid crystal materials are described in U.S. Pat. No. 7,256,921 at column 82, line 62 to column 84, line 11, the cited portions of which are incorporated by reference herein.

Also, the alignment layer can comprise a polymeric sheet oriented in a first general direction, and the dichroic dye and/or the photochromic-dichroic dye can be aligned in a second general direction which is parallel to the first general direction. In a particular example of the present invention, the alignment layer can be linearly polarizing and can comprise an oriented polymeric sheet of polyvinyl alcohol, vinyl butyral, polyethylene terephthalate, polyalkyl(meth) acrylate, polyamide, poly(amide-ether) block copolymers, poly(ester-ether) block copolymers, poly(ether-urethane) block copolymers, poly(ester-urethane) block copolymers, and/or poly(ether-urea) block copolymers. The term "oriented polymeric sheet" as used herein means a polymeric sheet which has at least a first general direction (of alignment), such a first general direction imparted to the sheet by stretching.

The alignment layer can be linearly polarizing and may comprise an optical quality polymeric sheet or film comprised of a disperse phase of polymeric particles disposed within a continuous birefringent matrix, which film can be oriented in one or more directions. The size and shape of the disperse phase particles, the volume fraction of the disperse phase, the film thickness and the amount of orientation are chosen to attain a desired degree of diffuse reflection and total transmission of radiation of a desired wavelength in the film. Such sheets/films and their preparation are described in U.S. Pat. No. 5,867,316 at column 6, line 47 to column 20, line 51, the cited portion of which is incorporated herein by reference. The alignment layer when linearly polarizing also may comprise the birefringent multilayer optical films described in U.S. Pat. No. 5,882,774, at column 2, line 63 to column 18, line 31, the cited portion of which is incorporated herein by reference. Further, the alignment layer also can comprise a two-component polarizer (i.e., dichroic and reflective polarizing components) such as that described in U.S. Pat. No. 6,096,375 at column 3, line 7 to column 19, line 46, the cited portion of which is incorporated herein by reference.

The dichroic material and/or the photochromic-dichroic material present in the first composition are aligned in a second general direction, i.e., along the long-axis of the dichroic compound and/or the photochromic-dichroic compound, and the second general direction is parallel to at least the first general direction of the alignment layer. As used herein with reference to order or alignment of a material or structure, the term "general direction" refers to the predominant arrangement or orientation of the material, compound or structure. Further, it will be appreciated by those skilled in the art that a material, compound or structure can have a general direction even though there is some variation within the arrangement of the material, compound or structure, provided that the material, compound or structure has at least one predominate arrangement.

Various non-limiting embodiments disclosed herein will now be illustrated in the following examples.

EXAMPLES

Part I: Coating Composition

Four coating compositions were prepared according to Table 1 below.

TABLE 1

Preparation of Coating Compositions

| Coating Composition | Preparation |
|---|---|
| A | Part 2-A of the Examples section of U.S. Pat. No. 9,028,728, columns 82 and 83, formulated with a mixture of photochromic dyes designed to give a grey tint upon exposure to actinic radiation |

TABLE 1-continued

Preparation of Coating Compositions

| Coating Composition | Preparation |
|---|---|
| B | The composition of Coating Composition A with no photochromic dyes |
| C | Example 1 of U.S. Pat. No. 8,608,988 formulated with a mixture of photochromic dyes designed to give a grey tint upon exposure to actinic radiation |
| D | The composition of Coating Composition C with no photochromic dyes |

Each composition was adjusted with organic solvent SOLVESSO® 100 (available from ExxonMobil Chemical) to achieve the respective viscosities indicated in each example below. Viscosity was measured using a Brookfield DVII+Pro viscometer, Model No. RVDV-II+PCP at 20° C.

Part II: Coating Procedure

Example 1

A base 5 CR-39 Plano lens with a diameter of 75 mm (purchased from Omega Optix) was mounted at a 45-degree angle from horizontal on an adjustable lens holder. The top of the lens was defined as the uppermost portion of the lens when it was positioned on the lens holder, while the bottom of the lens was defined as the lowermost portion of the lens.

Coating Composition A, adjusted to a viscosity of 200 cPs, was applied manually with a 5 ml disposable plastic pipette horizontally along the center of the lens and allowed to flow to the bottom. Coating Composition A, adjusted to a viscosity of 100 cPs, was then applied in a similar manner to the lens to a region extending from 10 cm from the top of the lens to a 10 mm overlap on the previous coating. Coating Composition B, adjusted to a viscosity of 100 cPs, was applied to previously uncoated portion at the top. The coating was allowed to flow over the previous coatings for 15 seconds.

The lens prepared above was then spun on a spin coater at 800 rpm for 20 seconds, with an acceleration of 1000 Rad/s$^2$. The coating was then cured in a thermal oven for 90 minutes at 120° C.

Example 2

A base 5 CR-39 Plano lens with a diameter of 75 mm (purchased from Omega Optix) was mounted at a 35-degree angle from horizontal on an adjustable lens holder.

Coating Composition C, adjusted to a viscosity of 250 cPs, was dispensed using a disposable 5 mL pipette horizontally along the center of the lens and allowed to flow to the bottom of the lens. Coating Composition C, adjusted to a viscosity of 150 cPs, was dispensed along a horizontal line 10 mm above the center of the lens. This coating was then allowed to flow down the lens face until it overlapped the initial coating. Coating Composition D, adjusted to a viscosity of 120 cPs, was then applied to the remaining uncoated section of the lens again with a disposable 5 ml pipette. This coating covered the previously uncoated area and was allowed to flow over the first two coatings all the way to the bottom of the lens.

The lens prepared above was then spun and cured as in Example 1.

Example 3

A base 5.25 CR-39 Plano lens with a diameter of 75 mm (purchased from Omega Optix) was mounted at an 80-degree angle from horizontal on an adjustable lens holder.

Two Sealey Airbrush AB 932 V.3 kits were purchased from Sealey Group, Bury, St. Edmunds, Suffolk, UK. The first brush was charged with 5 mL of Coating Composition C adjusted to a viscosity of 150 cPs. The second brush was charged with 5 mL of Coating Composition D adjusted to a viscosity of 150 cPs. The top 40 mm was sprayed using Brush 1 while the remaining 35 mm was sprayed using Brush 2, with an approximately 20 mm overlap between the two coatings. The brushes were moved in horizontal paths extending beyond the edges of the lens, indexing down until the full volume of coating had been discharged. The combination of spray application and gravity flow produced the overlap. This orientation of coatings is opposite those of the previous two examples in which the top of the lenses received the coating compositions without photochromic dyes. The lens prepared above was then spun and cured as in Example 1.

Part III: Testing Procedures and Results

Example 1

The lens of Example 1 was exposed to 365-nanometer ultraviolet light for about 10 minutes at a distance of about 14 centimeters to activate the photochromic materials. The activated sample was examined visually and observed to have a gradual decrease in darkness from the bottom to the top of the lens as related to the position held during the coating processes.

Example 2

The lens of Example 2 was irradiated for 400 seconds using an Oriel Apex Illuminator Model 71228 arc lamp, available from Newport Corporation. Absorbance spectra were recorded at three locations on the lens, corresponding to 5 mm from the lens top, the center of the lens, and 5 mm from the lens bottom, relative to the positions defined during the coating procedures. The spectra were measured using a spectrophotometer. The corresponding percent transmission (% T, CIE Y transmission) at the three points are recorded in FIG. 1 and show an increase in transmission (i.e., decrease in darkness) from the bottom to the top of the lens.

Example 3

A white light diffuse LED source from Edmunds, set to full strength, was used as a backlight. The white light LED was allowed to warm up for >20 minutes prior to use. A UV LED engine from Innovations in Optics with 385 nm LEDs using a Model LLS5008 power supply (manufactured by Lambda) in constant current mode at 0.6 A and 3.03V was placed approximately 22 cm above the backlight surface. A Stingray F145C camera, available from AVT with a 50 mm lens at aperture f/11 (lens available from Edmunds), was used to acquire digital images of the lens before and after activation. Prior to activating the lens of Example 3, a digital image of the unactivated lens was acquired. Exposure times were adjusted in order to obtain an image that was within a measurable range of the camera. Once the exposure time was set, an Unactivated Image was collected. Then, light to the camera was blocked and a Dark Image was collected. The lens was activated using the UV light source for approximately 5 minutes by rotating the UV light source over top of the lens. After activation, the UV source was rotated out of position and a final Activated image of the gradient lens was acquired. For each of the images described above, four exposures were collected and averaged. The red, green and blue transmission of the lens, corresponding to the red, green and blue response of the camera were calculated using the following formula:

$$\% \text{ transmission} = 100 * ((\text{Activated Image} - \text{Dark Image})/(\text{Unactivated Image} - \text{Dark Image}))$$

Figure 2:
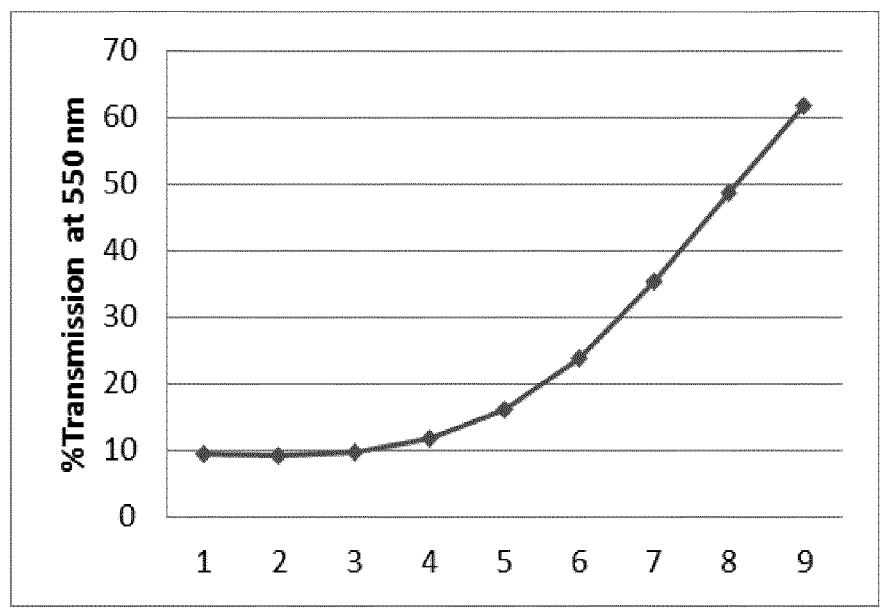
FIG. 2 shows the green light transmission recorded at different locations from top to bottom (reading from left to right) for the lens of Example 3.

Transmission data from the digital images were analyzed in an area of approximately 20 mm by 45 mm and approximately centered on the lens, the longer axis of the rectangle being from top to bottom. Note that if the gradient images were not exactly aligned with the camera, the digital % transmission images were rotated so that the gradient was approximately vertically oriented. Individual % transmissions over 5×5 mm squares were recorded in horizontal strips from the top to the bottom of the lens (relative to the position held during coating). Each "row" of 5×5 mm squares of % transmission values were averaged for each of the red, green and blue responses of the images. The "green response transmission", which is roughly peaked at 550 nm, was plotted as green % transmission as a function of distance down the lens. The lens of Example 3 provided a smooth gradient as demonstrated in FIG. 2, where the lower transmission corresponds to the top of the lens.

Although the present invention has been described with reference to specific details of certain embodiments thereof, it is not intended that such details should be regarded as limitations upon the scope of the invention except insofar as they are included in the accompanying claims.

The invention claimed is:

1. A method for imparting an optical element with at least one light influencing property in a gradient pattern, the method comprising:
   (a) providing an optical substrate having a first surface and a second surface;
   (b) depositing a first composition over a portion of the first surface of the optical substrate so as to provide a first treated surface region and an untreated surface region, the first composition comprising a material which provides at least one light influencing property;
   (c) depositing at least one second composition over the optical substrate of (b) to provide at least a second treated surface region over at least a portion of the untreated surface region and over a portion of the first treated surface region to form a first overlap region having a width in the range of 5 to 25 millimeters; and
   (d) spinning the optical substrate of (c) thereby providing the optical element having a light influencing property in a non-uniform, linear pattern over the first surface thereof in one direction.

2. The method of claim 1, wherein the at least one second composition is deposited over a portion of the first treated surface region to form a first overlap region, and over the entire untreated surface region to form a second treated surface region.

3. The method of claim 1, wherein in (c) the second composition is deposited over a portion of the first treated surface region to form the first overlap region, and over a portion of the untreated surface region to form a second treated surface region and a remaining untreated surface region.

4. The method of claim 3, wherein in (c) at least one additional composition is deposited over at least a portion of the second treated surface region to form a second overlap region, and over at least a portion of the remaining untreated surface region.

5. The method of claim 4, wherein, during the deposition of the at least one second composition and the at least one additional composition, the optical substrate is positioned at an angle of from 15° to 50° from horizontal, and the angle during the deposition of the at least one second composition and the at least one additional composition is the same or different from the angle during the deposition of the first composition.

6. The method of claim 1, further comprising (e) subjecting the optical substrate of (d) to at least one of thermal cure or radiation cure conditions.

7. The method of claim 1, wherein the first composition is deposited over at least 25 percent of the first surface of the optical substrate.

8. The method of claim 1, wherein the at least one second composition comprises a material which provides the at least one light influencing property.

9. The method of claim 1, wherein the first composition comprises a material selected from the group consisting of a fixed tint dye, a photochromic dye, a photochromic-dichroic dye, a dichroic dye, and mixtures thereof.

10. The method of claim 1, wherein the at least one second composition comprises a material which provides the at least one light influencing property, the material being selected from the group consisting of a fixed tint dye, a photochromic dye, a photochromic-dichroic dye, a dichroic dye, and mixtures thereof.

11. The method of claim 1, wherein, during the deposition of the first composition, the optical substrate is positioned at an angle of from 15° to 50° from horizontal.

12. The method of claim 1, wherein in (d) the spinning is accomplished in two stages such that the optical substrate of (c) first is subjected to spinning at a speed in the range of 200 rpm to less than 1000 rpm for a period of time in the range of 2 to 20 seconds, then subsequently is subjected to spinning at a speed in the range of 1000 rpm to 2000 rpm for a period of time in the range of 2 to 20 seconds.

13. The method of claim 1, wherein the light influencing property is selected from the group consisting of polarization, photochromicity, tint, and combinations of any of the foregoing light influencing properties.

14. The method of claim 1, wherein the optical element is selected from the group consisting of lenses, windows, display elements, goggles, visors, face shields, automotive transparencies, aerospace transparencies, and wearable displays.

15. The method of claim 14, wherein the optical element is a lens.

16. The method of claim 1, wherein the first surface of the optical substrate of (a) comprises an alignment layer thereover, and at least the first composition comprises a material selected from the group consisting of a dichroic dye, a photochromic-dichroic dye, and mixtures thereof.

17. The method of claim 16, wherein the alignment layer comprises:
   (i) an ordered liquid crystal material having an irreversibly fixed first general direction, and at least one of the dichroic dye or the photochromic-dichroic dye are aligned in a second general direction which is parallel to the first general direction; or
   (ii) a polymeric sheet having a first general direction, and at least one of the dichroic dye or the photochromic-dichroic dye are aligned in a second general direction which is parallel to the first general direction.

* * * * *